United States Patent
Kim et al.

(10) Patent No.: US 9,116,658 B2
(45) Date of Patent: Aug. 25, 2015

(54) MOBILE TERMINAL, IMAGE DISPLAY DEVICE MOUNTED ON VEHICLE AND DATA PROCESSING METHOD USING THE SAME

(75) Inventors: Jungwoo Kim, Seoul (KR); Sungha Choi, Seoul (KR); Jihwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 13/439,275

(22) Filed: Apr. 4, 2012

(65) Prior Publication Data

US 2013/0050271 A1 Feb. 28, 2013

Related U.S. Application Data

(60) Provisional application No. 61/527,610, filed on Aug. 25, 2011.

(51) Int. Cl.
G09G 5/00 (2006.01)
G06F 3/147 (2006.01)
(Continued)

(52) U.S. Cl.
CPC .............. *G06F 3/147* (2013.01); *G06F 3/1454* (2013.01); *H04L 67/08* (2013.01);
(Continued)

(58) Field of Classification Search
CPC .......................... G09G 2340/0407; G06T 3/40
USPC ........................................................ 345/660
See application file for complete search history.

(56) References Cited

U.S. PATENT DOCUMENTS 6,470,378 B1 * 10/2002 Tracton et al. ................ 709/203
6,832,241 B2 * 12/2004 Tracton et al. ................ 709/203
(Continued)

FOREIGN PATENT DOCUMENTS

FR       EP2237526       *  3/2009   .............. H04L 29/08
GB    WO 2012/080713    * 11/2011   ............... H04N 7/26
(Continued)

OTHER PUBLICATIONS

K.-J. Tan, J.-W. Gong, B.-T. Wu, D.-C. Chang, H.-Y. Li, Y.-M. Hsiao, Y.-C. Chen, S.-W. Lo, Y.-S. Chu, and J.-I. Guo, "A remote thin client system for real time multimedia streaming over vnc," in Multimedia and Expo (ICME), 2010 IEEE International Conference on, Jul. 2010, pp. 992-997.*

(Continued)

*Primary Examiner* — Devona Faulk
*Assistant Examiner* — Jin Ge
(74) *Attorney, Agent, or Firm* — Birch, Stewart, Kolasch & Birch, LLP

(57) ABSTRACT

A mobile terminal including a display unit outputting an image, a communication unit transceiving data with an external mobile terminal, and a controller controlling the communication unit to receive a screen information of the mobile terminal and a $1^{st}$ control information of the screen information from the mobile terminal and to transmit a $2^{nd}$ control information of the screen information to the mobile terminal, the controller controlling the display unit to transform the $1^{st}$ control information of the screen information and to output the transformed screen information to a user. The $1^{st}$ control information includes an image size transformation information of the screen information and an image compression format information of the screen information. The $2^{nd}$ control information includes a supportable compression format information.

21 Claims, 16 Drawing Sheets

(51) Int. Cl.
*H04L 29/08* (2006.01)
*G06F 3/14* (2006.01)

(52) U.S. Cl.
CPC ....... *G09G 2340/02* (2013.01); *G09G 2350/00* (2013.01); *G09G 2354/00* (2013.01); *G09G 2360/18* (2013.01); *G09G 2370/04* (2013.01); *G09G 2380/10* (2013.01)

(56) References Cited

U.S. PATENT DOCUMENTS

| | | | |
|---|---|---|---|
| 2003/0050973 A1* | 3/2003 | Tracton et al. | 709/203 |
| 2003/0076429 A1 | 4/2003 | Karasaki et al. | |
| 2004/0093432 A1* | 5/2004 | Luo et al. | 709/247 |
| 2005/0019015 A1 | 1/2005 | Ackley et al. | |
| 2007/0203641 A1* | 8/2007 | Diaz et al. | 701/208 |
| 2008/0088636 A1 | 4/2008 | Ho | |
| 2009/0096711 A1 | 4/2009 | Jang et al. | |
| 2011/0122074 A1* | 5/2011 | Chen et al. | 345/173 |
| 2012/0034904 A1* | 2/2012 | LeBeau et al. | 455/414.1 |
| 2012/0057788 A1* | 3/2012 | Fukuhara et al. | 382/173 |
| 2013/0024777 A1* | 1/2013 | Brakensiek et al. | 715/740 |

FOREIGN PATENT DOCUMENTS

| | | |
|---|---|---|
| KR | 10-2007-0111058 A | 11/2007 |
| KR | 10-2009-0038204 A | 4/2009 |
| KR | 10-1017866 B1 | 3/2011 |

OTHER PUBLICATIONS

X. Zhang and H. Takahashi, "A hybrid data compression scheme for improved VNC," Systemics, Cybernetics and Informatics, vol. 5, No. 2 pp. 1-4, 2007.*

Tristan Richardson, The RFB Protocol. ORL,Cambridge, RealVNC Ltd, Aug. 12, 2003.*

NEC, Users Manual of MultiSync P410 display, 2010.*

Bose, R., Brakensiek, J. & Park, K.-Y. (2010). Terminal mode: transforming mobile devices into automotive application platforms. Proceedings of the 2nd International Conference on Automotive User Interfaces and Interactive Vehicular Applications (AutomotiveUI), ACM, pp. 148-155.*

* cited by examiner

Figure 5

| Elements | Sub elements | Description |
|---|---|---|
| Connectivity Information | Bdaddr | Bluetooth MAC address |
| | startConnection | Whether to use Bluetooth as basic channel for sending audio e.g. True or false |
| RTP Information | payloadType | supportable RTP payload type information e.g. mono (8bits, 8kHz) or stereo (16bits, 48kHz) |
| | audioIPL | minimum buffer size for playing back audio data received from RTP |
| | audioMPL | maximum buffer size for buffering audio data received from RTP |
| Icon Preference | mimetype | Kind of icon image e.g. image/png |
| | height | Image size (vertical length) |
| | width | Image size (horizontal length) |

Figure 6

| Elements | Subelements | Description |
|---|---|---|
| Application Information | appCategory | Category of applications<br>e.g. Navigation, SMS, Email |
| | trustLevel | trust level of application<br>e.g. Unknown, user configuration, self-egistered application, registered application, application certificate |
| Display Information | contentCategory | Category of contents provided by applications<br>e.g. Text, video, image, user interface, car mode, misc. |
| | contentRules | rules defining whether contents shall be displayed<br>e.g. Minimum font size required, no video is shown, no automatic scrolling text, maximum feedback time |
| Remoting Information | protocolID | remoting protocols to be used between applications<br>e.g. VNC, RTP, BTA2DP, DAP |
| | format | content type to be transmitted through Remoting protocol.<br>e.g. RTP payload type (mono or stereo) |
| Audio Information | audioType | type of audio<br>e.g. phone call audio, application audio, all, none |
| | audioCategory | Category of audio<br>e.g. phone audio, media audio out/in, voice command out/in |
| | contentRules | rules defining whether contents shall be displayed |
| | trustLevel | trust level of application |

Figure 9

| Number | Message Name | Origin | Description |
|---|---|---|---|
| 0 | Set Pixel Format | Client | framebuffer information of the image display apparatus (endian, color depth, RGB max/bit shift information, etc) |
| 2 | Set Encodings | Client | information of encoding list that the image display apparatus can support |
| 3 | Framebuffer Update Request | Client | request for update of new framebuffer data |
| 4 | Key Event | Client | hard key event (like a keyboard of PC) |
| 5 | Pointer Event | Client | pointer Event (single touch) |
| 6 | Client Cut Text | Client | clip board event |
| 0 | Frame buffer Update | Server | frame update message for Framebuffer Update Request message |
| 1 | Set Colour Map Entries | Server | offer of information if Set Pixel Format uses colormap |
| 2 | Bell | Server | ringing bells to the image display apparatus |
| 3 | ServerCutText | Server | clip board event |

Figure 10

| Extension-Type | Message Name | Origin | Server Dupport | Client Support |
|---|---|---|---|---|
| 1 | Server Display Configuration | Server | MUST | MUST |
| 2 | Client Display Configuration | Client | MUST | MUST |
| 3 | Server Event Configuration | Server | MUST | MUST |
| 4 | Client Event Configuration | Client | MUST | MUST |
| 5 | Event Mapping | Server | MUST | MAY |
| 6 | Event Mapping Request | Client | MUST | MAY |
| 7 | Key Event Listing | Server | SHOULD | MAY |
| 8 | Key Event Listing Request | Client | SHOULD | MAY |
| 9 | Virtual Keyboard Trigger | Server | SHOULD | MAY |
| 10 | Virtual Keyboard Trigger Request | Client | SHOULD | MAY |
| 11 | Device Status | Server | MUST | SHOULD |
| 12 | Device Status Request | Client | MUST | SHOULD |
| 13 | Content Atteestation Response | Server | SHOULD | SHOULD |
| 14 | Content Atteestation Request | Client | SHOULD | SHOULD |
| 16 | Framebuffer Blocking Notification | Client | MUST | MUST |
| 18 | Audio Blocking Notification | Client | MUST | MUST |
| 20 | Touch Event | Client | MUST | MUST |
| 21 | Framebuffer Alternatiive Text | Server | MAY | MAY |
| 22 | Framebuffer Alternatiive Text Request | Client | MAY | MAY |

Figure 12

| Resizing level | Resizing factor |
|---|---|
| 1 | Width × Height , 1 |
| 2 | (Width / 2)×(Height / 2) , 1/4 |
| 3 | (Width / 4)×(Height / 4), 1/16 |

Figure 13

|  | Bits-per-pixel | Color depth | Red max | Green max | Blue max | Red shift | Green shift | Blue shift |
|---|---|---|---|---|---|---|---|---|
| ARGB 888 | 32 | 24 | 255 | 255 | 255 | 16 | 8 | 0 |
| RGB 565 | 16 | 16 | 31 | 63 | 31 | 11 | 5 | 0 |
| RGB 555 | 16 | 15 | 31 | 31 | 31 | 10 | 5 | 0 |
| RGB 444 | 16 | 12 | 15 | 15 | 15 | 8 | 4 | 0 |
| RGB 343 | 16 | 10 | 7 | 15 | 7 | 7 | 3 | 0 |

Figure 14

| # bytes | Type | Value | Description |
|---|---|---|---|
| 1 | U8 | 128 | Message -type |
| 1 | U8 | 2 | Extension -type |
| 2 | U16 | 14 | Payload length |
| 1 | U8 | 1 | Terminal Mode Client Major Version |
| 1 | U8 | 0 | Terminal Mode Client Minor Version |
| 2 | U16 | Bit | Framebuffer Configuration (1 = yes, 0 = no) |
| | | [0] | Server - sid framebuffer orientation switch used |
| | | [1] | Server - sid framebuffer rotation used |
| | | [2] | Client -side framebuffer up -scaling available |
| | | [3] | Client -side framebuffer down -scaling available |
| | | [4] | Server MUST replace VNC framebuffer update message with empty VNC framebuffer update message |
| | | [5] | Client supports Framebuffer Alternative Text messages |
| | | [6] | Frame transformation used |
| 2 | U16 | | Client display width [pixel] |
| 2 | U16 | | Client display height [pixel] |
| 2 | U16 | | Client display width [mm] |
| 2 | U16 | | Client display height [mm] |
| 2 | U16 | | Distance user |
| 4 | U32 | Bit | Pixel format support |
| | | [0] | 32-bit ARGB 888 |
| | | [7] | Any other b32 format |
| | | [8] | 24-bit RGB 888 |
| | | [15] | Any other 24 bit format |
| | | [16] | 16-bit RGB 565 |
| | | [17] | 16-bit RGB 555 |
| | | [18] | 16-bit RGB 444 |
| | | [19] | 16-bit RGB 343 |
| | | [23] | Any other b16 format |
| | | [24] | 16-bit single color |
| | | [25] | 8-bit single color |

Figure 15

| data bytes | Type | Value | Description |
|---|---|---|---|
| 2 | U16 | | X-position of rectangle (top left corner) |
| 2 | U16 | | Y-position of rectangle (top left corner) |
| 2 | U16 | | Original width of following rectangle |
| 2 | U16 | | Original height of following rectangle |
| 4 | U32 | -527 | Encoding type |
| 2 | U16 | | Resizing factor |
| 2 | U16 | | Pixel format |
| ... | | | |

MOBILE TERMINAL, IMAGE DISPLAY DEVICE MOUNTED ON VEHICLE AND DATA PROCESSING METHOD USING THE SAME

This application claims the benefit of the U.S. Provisional Patent Application No. 61/527,610, filed on Aug. 25, 2011, which is hereby incorporated by reference as if fully set forth herein.

BACKGROUND OF THE INVENTION

1. Field of the Invention

The present invention relates to a mobile terminal, image display device mounted on a vehicle and data processing method using the same. Although the present invention is suitable for a wide scope of applications, it is particularly suitable for the mobile terminal and the image display device to share a screen with each other.

2. Discussion of the Related Art

Generally, an image display device is the device that displays image information using a screen. In particular, an image display device mounted on a vehicle provides a user with such a function as a vehicle information display function, a navigation system function, a TV output function and the like. The recent development of technology enables an image display device mounted on a vehicle to perform data communication with a mobile terminal carried by a user by being connected with the mobile terminal using wire/wireless network.

Through the data communication between the image display device mounted on the vehicle and the mobile terminal, screen data of one device is transmitted to another device so as to share a screen between the two devices. However, in order to share a screen between the image display device and the mobile terminal, the demand for a data processing method for efficiently transmitting screen data between devices is rising.

SUMMARY OF THE INVENTION

Accordingly, the present invention is directed to a mobile terminal, image display device mounted on a vehicle and data processing method using the same, which may substantially obviate one or more of the problems due to limitations and disadvantages of the related art.

An object of the present invention is to provide a mobile terminal, image display device mounted on a vehicle and data processing method using the same, by which a transmission rate of screen data can be improved in a manner of adjusting a compression scheme for a transmission screen, a loss rate of the transmission screen and the like to be suitable for a screen situation in transmitting screen data of the mobile terminal to the image display device to enable the image display device and the mobile terminal to share a screen with each other.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, an image display device mounted on a vehicle according to one embodiment of the present invention may include a display unit configured to output an image, a communication unit configured to transceive data with an external mobile terminal, and a controller configured to control the communication unit to receive a screen information of the mobile terminal and a $1^{st}$ control information of the screen information from the mobile terminal, the controller configured to control the communication unit to transmit a $2^{nd}$ control information of the screen information to the mobile terminal, the controller configured to control the display unit to transform the $1^{st}$ control information of the screen information, the controller configured to control the display unit to output the transformed screen information to a user, wherein the $1^{st}$ control information comprises an image size transformation information of the screen information and an image compression format information of the screen information and wherein the $2^{nd}$ control information comprises a supportable compression format information.

Preferably, the $2^{nd}$ control information may further include an information indicating whether the screen information is a transformed screen.

Preferably, the $2^{nd}$ control information may further include a supportable encoding type information.

Preferably, the $2^{nd}$ control information may further include an information of a $1^{st}$ frame buffer included in the image display device mounted on the vehicle.

Preferably, the image size transformation information may include a multiple information of an image size of the screen information.

Preferably, the communication unit may receive the screen information using VNC (virtual networking computing).

More preferably, the controller may receive the screen information generated from a $2^{nd}$ frame buffer included in the mobile terminal.

In this case, the $2^{nd}$ control information may include an information for requesting the $2^{nd}$ frame buffer to update the screen information.

And, the $1^{st}$ control information may include an information for notifying the $2^{nd}$ frame buffer that the screen information has been updated and an information of the updated $2^{nd}$ frame buffer.

To further achieve these and other advantages and in accordance with the purpose of the present invention, a mobile terminal according to another embodiment of the present invention may include a communication unit configured to transceive data with an external image display device and a controller configured to control the communication unit to transmit a screen information of the mobile terminal and a $1^{st}$ control information of the screen information to the image display device, the controller configured to control the communication unit to receive a $2^{nd}$ control information of the screen information from the image display device, the controller configured to generate the screen information in accordance with the $1^{st}$ control information, wherein the $1^{st}$ control information comprises an image size transformation information of the screen information and an image compression format information of the screen information and wherein the $2^{nd}$ control information comprises a supportable compression format information supportable by the image display device.

Preferably, the $2^{nd}$ control information may further include an information indicating whether the screen information is a transformed screen.

Preferably, the $2^{nd}$ control information may further include an encoding type information supportable by the image display device.

Preferably, the $2^{nd}$ control information may further include an information of a $1^{st}$ frame buffer included in the image display device mounted on the vehicle.

Preferably, the image size transformation information may include a multiple information of an image size of the screen information.

Preferably, the communication unit may transmit the screen information using VNC (virtual networking computing).

More preferably, the controller may generate the screen information from a $2^{nd}$ frame buffer included in the mobile terminal.

More preferably, the $2^{nd}$ control information may include an information for requesting the $2^{nd}$ frame buffer to update the screen information.

More preferably, the $1^{st}$ control information may include an information for notifying the $2^{nd}$ frame buffer that the screen information has been updated and an information of the updated $2^{nd}$ frame buffer.

Accordingly, the present invention may improve a transmission rate of screen data in a manner of adjusting a compression scheme for a transmission screen, a loss rate of the transmission screen and the like to be suitable for a screen situation in transmitting screen data between a mobile terminal and an image display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a table of a client profile according to an embodiment of the present invention;

FIG. 6 is a table of an application list according to an embodiment of the present invention;

FIG. 9 is a table of a message of VNC service according to an embodiment of the present invention;

FIG. 10 is a table of an extended message of VNC service according to an embodiment of the present invention;

FIG. 12 is a table of a resizing level according to an embodiment of the present invention;

FIG. 13 is a table of a pixel format according to an embodiment of the present invention;

FIG. 14 is a table of client display configuration according to an embodiment of the present invention;

FIG. 15 is a table of a framebuffer update according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an image processing in an image display apparatus mounted to a vehicle according to the present invention will be explained in more detail with reference to the attached drawings. The suffixes attached to components, such as 'module' and 'unit' or 'portion' were used for facilitation of the detailed description of the present invention. Therefore, the suffixes do not have different meanings from each other.

Figure 1:
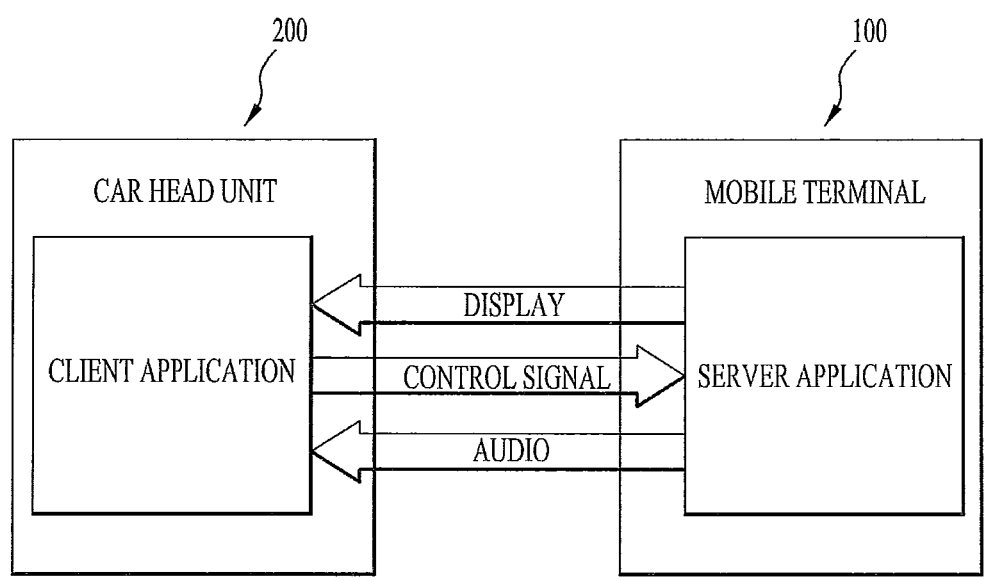
FIG. 1 is a schematic diagram of a data processing system including an image display device and a mobile terminal according to an embodiment of the present invention.

FIG. 1 is a view schematically illustrating a data processing system including a mobile terminal and an image display apparatus according to a first embodiment of the present invention.

As shown in FIG. 1, a data processing system according to a first embodiment of the present invention comprises a mobile terminal 100 and an image display apparatus 200.

The mobile terminal 100 may be connected to the image display apparatus 200 in a wired or wireless manner, and transmit at least one of a video signal and an audio signal to the image display apparatus 200.

The image display apparatus 200 is mounted to a vehicle in a fixed manner, and may be connected to the mobile terminal 100 in a wired or wireless manner to receive at least one of a video signal and an audio signal from the mobile terminal 100. And, the image display apparatus 200 may output at least one of a video signal and an audio signal received from the mobile terminal 100.

The image display apparatus 200 may receive an input from a user, and transmit the received input to the mobile terminal 100. For instance, once a user performs a touch input through a touch screen of the image display apparatus 200, the image display apparatus 200 may recognize a position where the touch input has been performed on a screen image, and may transmit information on the recognized position to the mobile terminal 100.

The mobile terminal 100 may determine the occurrence of a touch event at a position where the touch input has been performed, and may execute an operation corresponding to the generated touch event. That is, the user may control an operation of the mobile terminal 100 by using a touch screen, a hard key, etc. of the image display apparatus 200.

As one example of a data processing system, a user executes a road guiding application (or dialing, phonebook, e-mail, moving image play application, etc.) installed at the mobile terminal 100. Then, the mobile terminal 100 transmits an execution image of the road guiding application to the image display apparatus 200 so that the execution image of the road guiding application can be displayed on the image display apparatus 200.

The user may view the execution image of the road guiding application on a large screen of the image display apparatus 200, rather than on a small screen of the mobile terminal 100. And, the user may hear a road guiding sound through a speaker of the vehicle, rather than through a speaker of the mobile terminal 100.

Once the user selects a road guidance-related menu by using a touch screen or a hard key of the image display apparatus 200, the mobile terminal 100 may execute an operation corresponding to the menu. Then, the mobile terminal 100 may output an execution result with respect to the operation corresponding to the menu to the image display apparatus 200.

The mobile terminal 100 and the image display apparatus 200 may be connected to each other by using a short-range communication standard such as Bluetooth, a wireless internet standard such as Wi-Fi, an external device interface standard such as a universal serial bus (USB), and so on.

A server application for providing a service by a client' request may be installed at the mobile terminal 100, and a client application for accessing a service provided from a server may be installed at the image display apparatus 200.

The server application of the mobile terminal 100 is configured to capture a screen of the mobile terminal 100 regardless of an application type of the mobile terminal, and transmits the captured screen to the client application of the image display apparatus 200. And, the server application controls an operation of the mobile terminal 100 based on information received from the client application, the information on an event having occurred from the image display apparatus 200.

For instance, the image display apparatus 200 may remotely control the mobile terminal 100 in a virtual network computing (VNC) manner using a remote frame buffer (RFB) protocol which provides remote access with respect to graphical user interfaces. According to the VNC method, the mobile terminal 100 transmits a screen update to the image display apparatus 200 through a network, and transmits an event having occurred from the image display apparatus 200 to the mobile terminal 100.

And, the mobile terminal 100 may transmit an audio signal to the image display apparatus 200 or a headset or a hands-free, etc., according to an advanced audio distribution profile (A2DP) which defines a sound quality of an audio signal (stereo or mono) streamed to a second device from a first device through a Bluetooth connection, especially, a headset profile (HSP) relating to a Bluetooth headset, and a hands-free profile (HFP) applied to a hands-free for a vehicle, etc.

The mobile terminal 100 and the image display apparatus 200 may exchange additional information with each other based on additional protocols. For instance, the image display apparatus 200 may provide, to the mobile terminal 100, information on a vehicle status such as travel information, speed information and fuel information.

Applications installed at the mobile terminal 100 may be executed based on information on a vehicle status received from the image display apparatus 200 by using additional protocols. These applications may provide, to the image display apparatus 200, information on an application type (e.g., road guidance, multimedia, game, etc.), a graphic user interface (GUI) type (e.g., map, video, menu, etc.), an application status (e.g., execution status in a foreground or a background).

Figure 2:
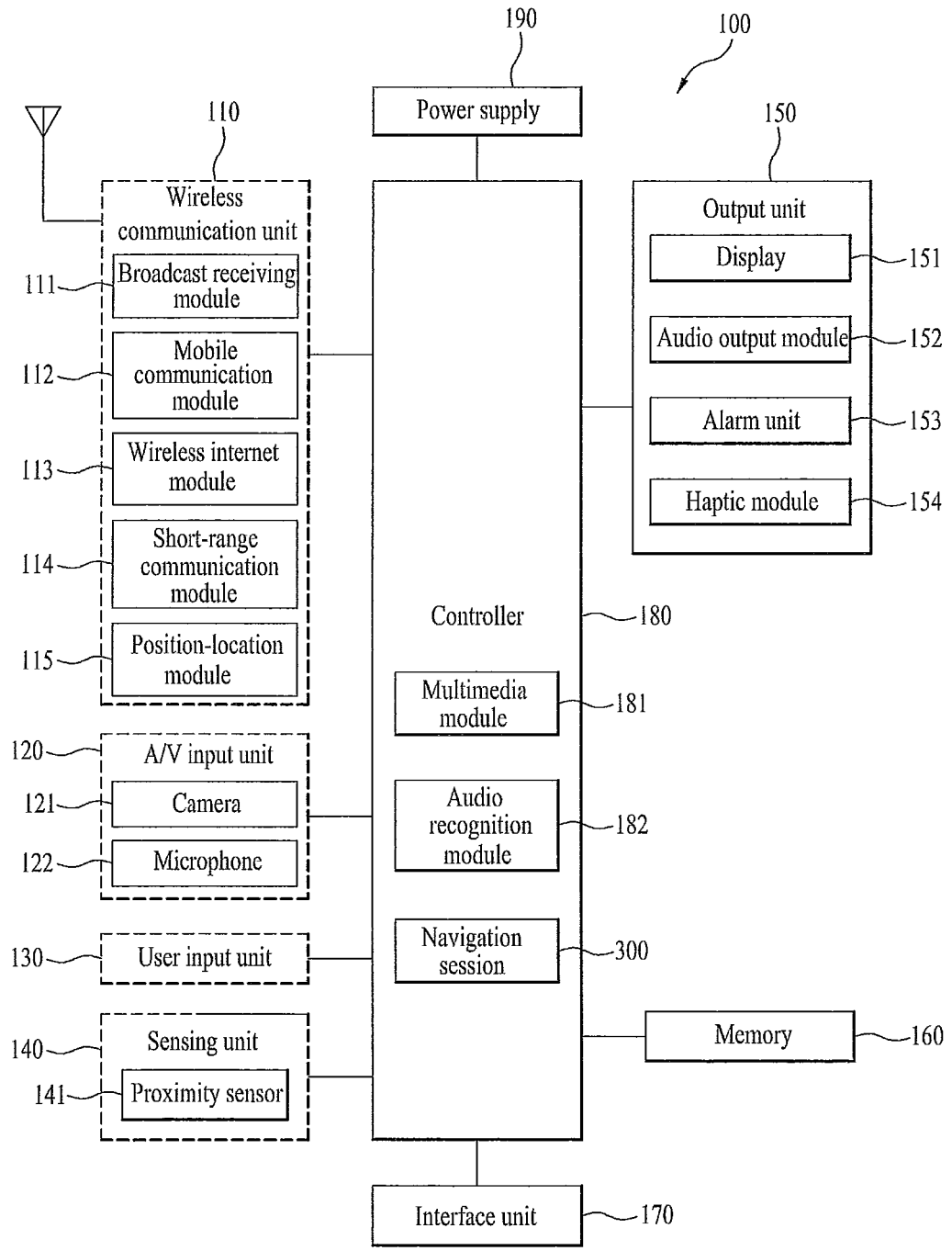
FIG. 2 is a block diagram of a mobile terminal according to an embodiment of the present invention.

FIG. 2 is a block diagram illustrating a configuration of the mobile terminal 100 according to the present invention. The mobile terminal 100 may be configured in various manners. For instance, the mobile terminal 100 may be implemented as a portable phone, a smart phone, a notebook computer, a digital broadcasting terminal, personal digital assistants (PDA), a portable multimedia player (PMP), etc.

As shown in FIG. 2, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 2 illustrates the mobile terminal 100 having various components, but it is understood that implementing all of the illustrated components is not a requirement. The mobile terminal 100 may be implemented by greater or fewer components.

The wireless communication unit 110 includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or a hybrid positioning system may be used.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units 151. For example, the mobile terminal may include both an external display unit (not shown) and an internal display unit (not shown).

When the display unit 151 and a sensor for sensing a touch operation (hereinafter, will be referred to as 'touch sensor') are overlaid in a layered manner to form a touch screen, the display unit 151 may function as both an input device and an output device. The touch sensor may be a touch film, a touch sheet, a touch pad, etc.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

The proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Accordingly, if the pointer is in proximity to the touch screen without contacting the touch screen, the position of the pointer and a distance between the pointer and the touch screen may be detected. Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying the occurrence of events from the mobile terminal 100. The events occurring from the mobile terminal 100 may include call received, message received, key signal input, touch input, and so on. The alarm 153 may output not only video or audio signals, but also other types of signals such as signals notifying the occurrence of events in a vibration manner. For instance, the alarm 153 may be configured to vibrate responsive to the mobile terminal receiving a call or message. As another example, when a key signal has been inputted, the alarm 153 may output vibration as a feedback of the key signal input. Through this vibration output, a user may recognize the occurrence of an event. In order to output a signal in a vibration manner, the mobile terminal may be mounted with a vibrator. Here, the video signal or audio signal may be outputted through the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100. For example, the haptic module 154 may be provided to a steering wheel, a gearshift, a lever, a seat, and the like.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

An audio recognition module 182 is configured to recognize an audio signal generated from a user, and to execute a corresponding function according to the recognized audio signal.

A navigation session 300 applied to the mobile terminal 100 displays a travel path on map data.

Image Display Apparatus

Figure 3:
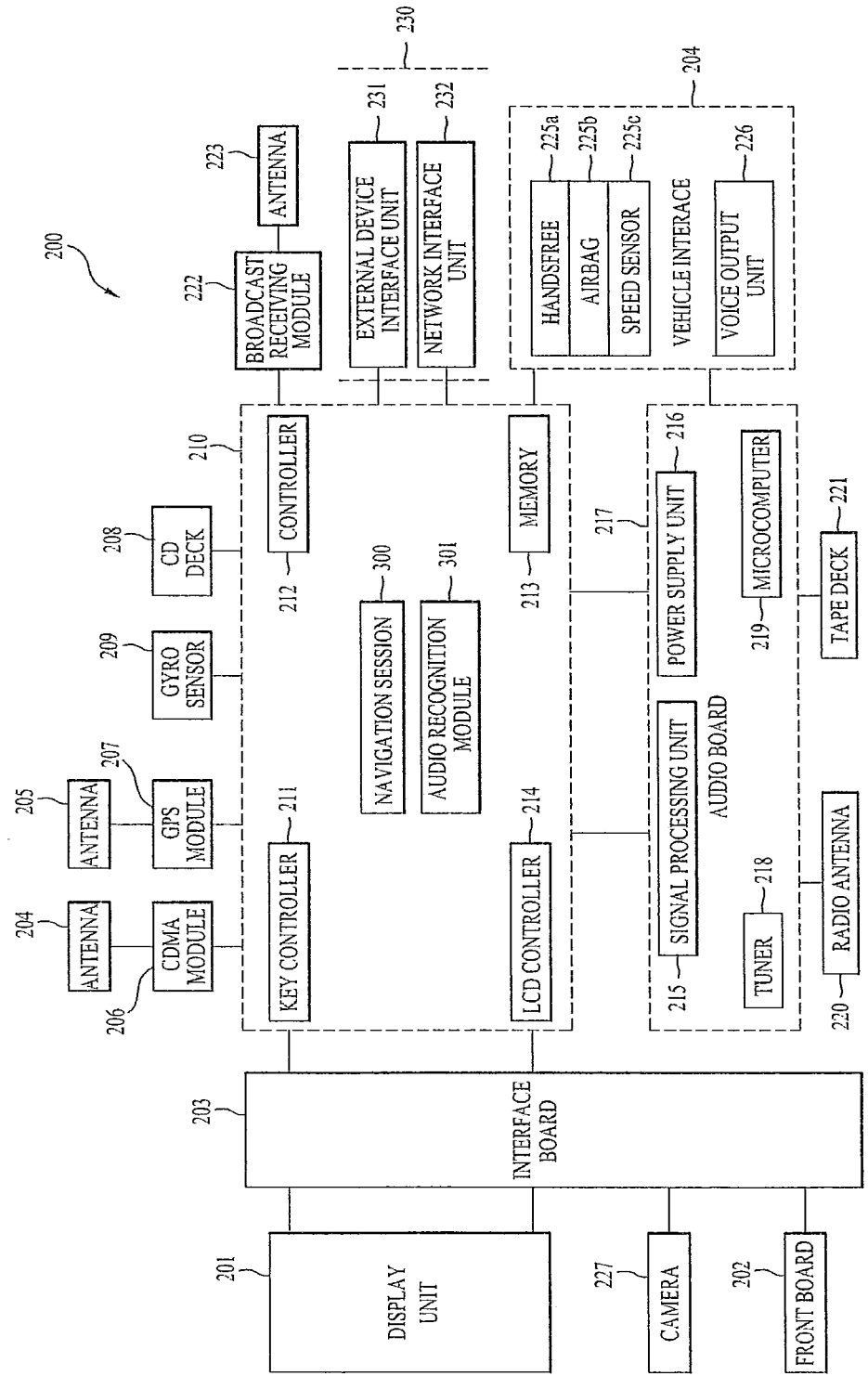
FIG. 3 is a block diagram of an image display device according to an embodiment of the present invention.

FIG. 3 is a block diagram illustrating a configuration of an image display apparatus 200 according to the present invention.

As shown in FIG. 3, the image display apparatus 200 comprises a main board 210 including a controller 212 configured to control an overall operation of the image display apparatus 200 (e.g., a central processing unit: CPU), a memory 213 configured to store therein programs for processing the controller 212 and input/output data, a key controller 211 configured to control each kind of key signals, and an LCD controller 214 configured to control a liquid crystal display (LCD).

The memory 213 may store therein map information (map data) for displaying road guidance information on a digital map. Also, the memory 213 may store therein a traffic information collection control algorithm for inputting traffic information according to a road condition in which a vehicle is currently traveling, and information for controlling the algorithm.

To the main board 210, may be connected a CDMA (code division multiple access) module 206 provided with a unique device number and mounted in a vehicle, a GPS module 207 configured to receive a GPS signal for guiding a position of a vehicle and tracking a travel path from a starting point to a destination point or to transmit traffic information collected by a user in the form of a global positioning system (GPS) signal, a CD deck 208 configured to play a signal recorded in a compact disk (CD), a gyro sensor 209, etc. The CDMA module 206 and the GPS module 207 may transmit or receive signals through antennas 204 and 205.

A broadcast signal receiving module 222 may be connected to the main board 210, and may receive a broadcast signal through an antenna 223. To the main board 210, may be connected a display unit (LCD) 201 controlled by the LCD controller 214 through an interface board 203, a front board 202 controlled by the key controller 211, and a camera 227 configured to capture inside and/or outside of a vehicle. The display unit 201 is configured to display each kind of video signals and text signals. The front board 202 is provided with buttons for inputting each kind of key signals, and supplies a key signal corresponding to a button selected by a user to the main board 210. And, the display unit 201 includes the proximity sensor and the touch sensor (touch screen) of FIG. 2.

The front board 202 may be provided with a menu key for directly inputting traffic information, and the menu key may be configured to be controlled by the key controller 211.

The audio board 217 is connected to the main board 210, and processes each kind of audio signals. The audio board 217 includes a micro computer 219 configured to control the audio board 217, a tuner 218 configured to receive a radio signal, a power unit 216 configured to supply power to the micro computer 219, and a signal processor 215 configured to process each kind of audio signals.

The audio board 217 includes a radio antenna 220 configured to receive a radio signal, and a tape deck 221 configured to play an audio tape. The audio board 217 may further include an audio output unit (e.g., amplifier) 226 configured to output an audio signal processed by the audio board 217.

The audio output unit (amplifier) 226 is connected to a vehicle interface 224. That is, the audio board 217 and the main board 210 are connected to the vehicle interface 224. To the vehicle interface 224, may be connected to a hands-free unit 225*a* for inputting an audio signal, an air bag 225*b* for a passenger's safety, a speed sensor 225*c* for detecting a vehicle speed, etc. The speed sensor 225*c* is configured to calculate a vehicle speed and to provide information on the calculated vehicle speed to the central processing unit 212.

The navigation session 300 applied to the image display apparatus 200 is configured to generate road guidance information based on map data and information on a current position of a vehicle, and to provide the generated road guidance information to a user.

The display unit 201 is configured to detect a proximity touch in a display window through a proximity sensor. For instance, when a pointer (e.g., a finger or a stylus pen) executes a proximity touch, the display unit 201 detects a position where the proximity touch has occurred and output position information corresponding to the detected position to the controller 212.

An audio recognition device (or audio recognition module) 301 is configured to recognize an audio signal (voice) generated from a user, and to perform a corresponding function according to the recognized audio signal.

The navigation session 300 applied to the image display apparatus 200 displays a travel path on map data. When the mobile terminal 100 is within a preset distance from a blind spot included in the travel path, the navigation session 300 automatically forms a wireless network with a terminal mounted to a peripheral vehicle (e.g., vehicle navigation system) and/or a mobile terminal held by a passerby through a wireless communication network (e.g., short-range wireless communication network). This may allow the navigation session 300 to receive position information of the peripheral vehicle from the terminal mounted to the peripheral vehicle, and to receive position information of the passerby from the mobile terminal held by the passerby.

The main board 210 may be connected to the interface unit 230, and the interface unit 230 may include an external device interface unit 231 and a network interface unit 232.

The external device interface unit 231 may connect an external device to the image display apparatus 200. For this, the external device interface unit 231 may include an A/V input/output unit (not shown) or a wireless communication unit (not shown).

The external device interface unit 231 may be connected to an external device in a wired or wireless manner, the external device such as a DVD (Digital Versatile Disk), a Blu ray, a game player, a camera, a camcorder and a notebook computer. The external device interface unit 231 transmits, to the controller 212, a video signal or an audio signal or a data signal input from the outside through the connected external device. And, the video signal or the audio signal or the data signal processed by the controller 212 may be output to the connected external device.

The A/V input/output unit may include a USB terminal, a CVBS (Composite Video Banking Sync) terminal, a component terminal, an S-video terminal (analogue), a DVI (Digital Visual Interface) terminal, an HDMI (High Definition Multimedia Interface) terminal, an RGB terminal and a D-SUB terminal, so that an audio signal and a video signal of an external device are input to the image display apparatus 200.

The wireless communication unit may perform a short-range wireless communication with other electronic device. For instance, the image display apparatus 200 may be connected to other electronic device through a network, according to a communication standard such as Bluetooth, RFID (Radio Frequency Identification), IrDA (infrared Data Association), UWB (Ultra Wideband), ZigBee and DLNA (Digital Living Network Alliance).

The external device interface unit 231 may be connected to various set-top boxes through one of the aforementioned terminals, thereby performing inputs and outputs with the set-top boxes.

The external device interface unit 231 may receive applications inside a neighboring external device or a list of applications, and transmit the received applications or list to the controller 212 or the memory 213.

The network interface unit 130 provides an interface for connecting the image display apparatus 100 to a wired/wireless network including an internet network. The network interface unit 130 may be provided with an Ethernet terminal for connection with a wired network, and may utilize communication standards such as WLAN (Wireless LAN)(Wi-Fi), Wibro (Wireless broadband), Wimax (World Interoperability for Microwave Access), and HSDPA (High Speed Downlink Packet Access) for connection with a wireless network.

The network interface unit 232 provides an interface for connecting the image display apparatus 200 to a wired or wireless network including an internet network. The network interface unit 232 may be provided with an Ethernet terminal for accessing a wired network, and may utilize a communication standard such as WLAN (Wireless LAN)(Wi-Fi), Wibro (Wireless broadband), Wimax (World Interoperability for Microwave Access) and HSDPA (High Speed Downlink Packet Access) for accessing a wireless network.

The network interface unit 232 may transmit or receive data to/from other user or other electronic device, through an accessed network or other network linked to an accessed network. Especially, the network interface unit 232 may transmit some of contents data stored in the image display apparatus 200, to a user or an electronic device selected from a plurality of users or electronic devices pre-registered in the image display apparatus 200.

The network interface unit 232 may access a predetermined web page through an accessed network or other network linked to an accessed network. More concretely, the network interface unit 232 may access a predetermined web page through a network thus to perform data transmission or data reception with a corresponding server. Also, the network interface unit 232 may receive contents or data provided from a contents provider or a network operator. More concretely, the network interface unit 232 may receive contents of a film, an advertisement, a game, a VOD, a broadcasting signal, etc. provided from a contents provider or a network provider through a network, and information relating to the contents. The network interface unit 232 may receive update information and an update file of a firmware provided from a network operator. The network interface unit 232 may transmit data to an internet or contents provider or a network operator.

And, the network interface unit 232 may receive, through a network, a desired application by selecting from applications open to the public.

Figure 4:
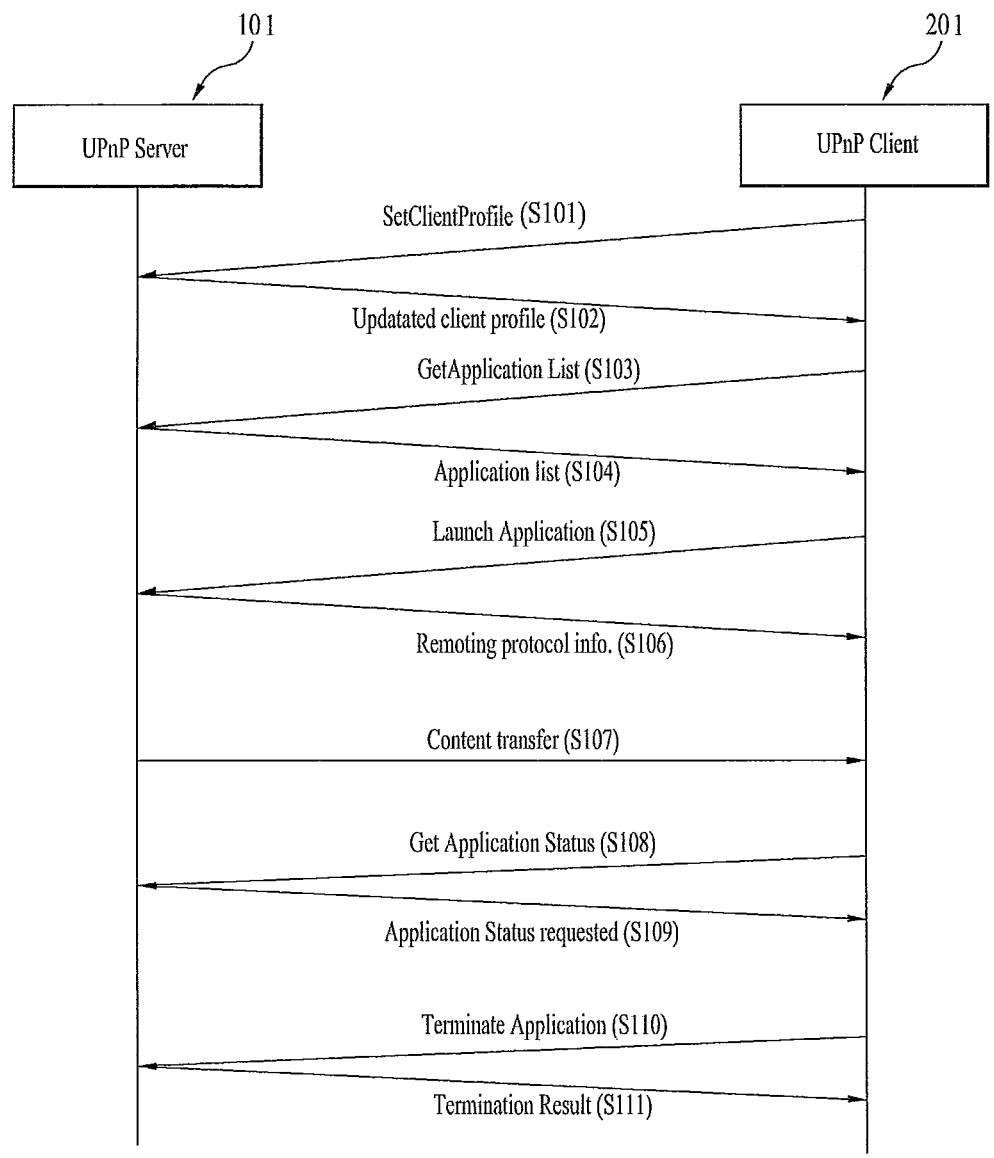
FIG. 4 is a flowchart of a sequence for an application launch in an image display device and a mobile terminal according to an embodiment of the present invention.

FIG. 4 is a flowchart of a sequence for an application launch in an image display device 200 and a mobile terminal 100 according to an embodiment of the present invention.

Referring to FIG. 4, a case of connecting the aforementioned image display device 200 and the aforementioned mobile terminal 100 by UPnP (universal plug and play) is explained as follows, for example.

First of all, UPnP is the technique of setting a connection between devices located in the same subnet. When a device is added to a local network, the UPnP enables the added device to be automatically connected to and interoperate with another device that supports UPnP. Primary functions of the UPnP include a device advertisement function of automatically searching a local network for a specific resource, a service action invocation function of activating a specific function of a specific device remotely or requesting information on the specific device, a data subscription function of exchanging events between devices and the like.

A sequence for an application launch shown in the drawing is one example of the aforementioned service action invocation and is the sequence for the image display device 200 to launch an application installed at the mobile terminal 100. In this case, the image display device 200 includes a UPnP client 201 as a module responsible for a UPnP function. And, the mobile terminal 100 includes a UPnP server 101 as a module responsible for a UPnP function.

The UPnP client 201 transmits a command 'SetClientProfile' to the UPnP server 101 [S101]. In this case, the SetClientProfile registers a client profile of the UPnP client 201 to the UPnP server 101. In this case, the client profile is general information on the UPnP client 201 and may include network address information, transceivable data size information, icon information and the like. Details of the client profile shall be described with reference to FIG. 5 later.

Subsequently, the UPnP server 101 transmits an updated client profile to the UPnP client 201 [S102]. In particular, the client profile of the UPnP client 100 registered to the UPnP server 200 is transmitted.

The UPnP client 201 transmits a command 'GetApplication' to the UPnP server 101 [S103]. The GetApplication makes a request for a list of applications, which can be launched in the UPnP client 201, among applications installed at the UPnP server 101.

The UPnP server 101 then transmits the list (Application List) of applications, which can be launched in the UPnP client 201, to the UPnP client 201 [S104]. In this case, the application list may contain application information, display information, remoting information, audio information and the like. And, the application list shall be described in detail with reference to FIG. 6 later.

The UPnP client 201 transmits a launch application, which commands a launch of a specific application, to the UPnP server 101 [S105]. In particular, a user may be able to command a launch of a specific application among the applications contained in the aforementioned application list. In doing so, the UPnP client 201 commands the UPnP server 101 to launch the specific application, which is selected by the user, using the launch application.

Subsequently, the UPnP server 101 transits a remoting protocol info. to the client UPnP 201 [S106]. In this case, the remoting protocol info. contains information on a remoting protocol used between applications.

The UPnP server 101 then transmits data, which is generated by the launch of the application, to the UPnP client 201 [Content transfer: S107].

The UPnP client 201 transmits a command 'GetApplicationStatus' for requesting status information on the specific application to the UPnP server 101 [S108]. The UPnP server 101 then transmits the requested application status information to the UPnP client 201 [Application status requested: S109].

Finally, the UPnP client 201 transmits a command 'TerminateApplication' for terminating the specific application to the UPnP server 101 [S110]. The UPnP server 101 terminates the launch of the specific application and then notifies the termination of the corresponding application to the UPnP client 201 [Termination result: S111].

Therefore, in accordance with the aforementioned sequence for the application launch, the image display device 200 launches the specific application installed at the mobile terminal 100 and a launched screen of the corresponding application may be outputted to the image display device 200.

FIG. 5 is a table of a client profile according to an embodiment of the present invention.

Referring to FIG. 5, a client file is general information on the UPnP client 201 and may contain connectivity information, RTP information and icon preference.

The connectivity information is the communication connectivity information of the UPnP client 201 and may contain Bluetooth MAC address (Bdaddr), information (startConnection) indicating whether to use Bluetooth as a basic channel for audio data transmission and the like.

The RTP information is the information on RTP (real time protocol) of the UPnP client 201 and may contain supportable RTP payload type information (payloadtype), minimum buffer size information (audioIPL) required for playing back audio data received by RTP, maximum buffer size information (audioMPL) for buffering audio data received by RTP and the like.

The icon reference is the information on an icon used by the UPnP client 201 and may contain a type (mimetype) of an icon image, icon image size information (e.g., height, width, etc.) and the like.

The UPnP client 201 registers the client profile of the UPnP client 201 to the UPnP server 101 through the aforementioned command 'SetClientProfile'. The UPnP server 101 then communicates with the UPnP 201 using the registered client profile.

FIG. 6 is a table of an application list according to an embodiment of the present invention.

Referring to FIG. 6, an application list is a list of applications, which can be launched in the UPnP client 201, among applications installed at the UPnP server 101 and may include such attribute information of a corresponding application as application information, display information, remoting information, audio information and the like.

The application information includes information (appCategory) on a category of application launchable in the UPnP client 201 and information (trustLevel) on trust level of application. One example of the trust level (trustLevel) of application may include information indicating whether a corresponding application corresponds to an unknown application, a user configuration application, a self-registered application or a registered application.

The display information may include information (contentCategory) on a content category provided by an application and information (contentRule) on a rule for determining whether to output a content.

The remoting information may include information (protocolID) on a remoting protocol to be used between applications, information (format) on a content type transmitted by a remoting protocol and the like.

And, the audio information may include type information (audioType) on an audio content, information (audioCategory) on a category of an audio content, information (trustLevel) on a trust level of a current audio content and the like.

Therefore, the UPnP client 201 receives the ApplicationList via the aforementioned command 'GetApplicationList' and may be then able to recognize category and attribute information on an application launchable in the UPnP client 201.

According to the above description of the sequence for the application launch, a specific application installed at the mobile terminal 100 is launched in the image display device 200 and information on the launched application is outputted to the image display device 200.

In the following description, in order for the mobile terminal 100 and the image display device 200 to share a screen with each other, a screen transmitting system configured to transmit screen information of one of the mobile terminal 100 and the image display device 200 to the other is explained.

In particular, in the screen transmitting system including the mobile terminal 100 and the image display device 200, as screen information of one of the image display device 200 and the mobile terminal 100 connected to each other is transmitted to and outputted from the other, each of the two devices (i.e., the image display device 200 and the mobile terminal 100) may be able to provide a user with the same screen.

In this specification, one example of transmitting screen information of the mobile terminal 100 to the image display device 200 is described as follows.

And, the screen transmitting system according to the present invention may be able to transmit the screen information of the mobile terminal 100 to the image display device 200 using VNC (virtual networking computing).

In particular, the VNC (virtual networking computing) is RFB (remote frame buffer) protocol for enabling devices located remotely to share a frame buffer with each other. According to the VNC, if a client makes a request for a current frame buffer content via network, a server delivers captures a frame buffer and then delivers the frame buffer in a client-understandable graphic format via the network. Hence, two devices may be able to share a screen with each other.

In this specification, if screen information of a mobile terminal is transmitted to an image display device 200 using VNC (virtual networking computing), it can be named a VNC service and described as follows.

Figure 7:
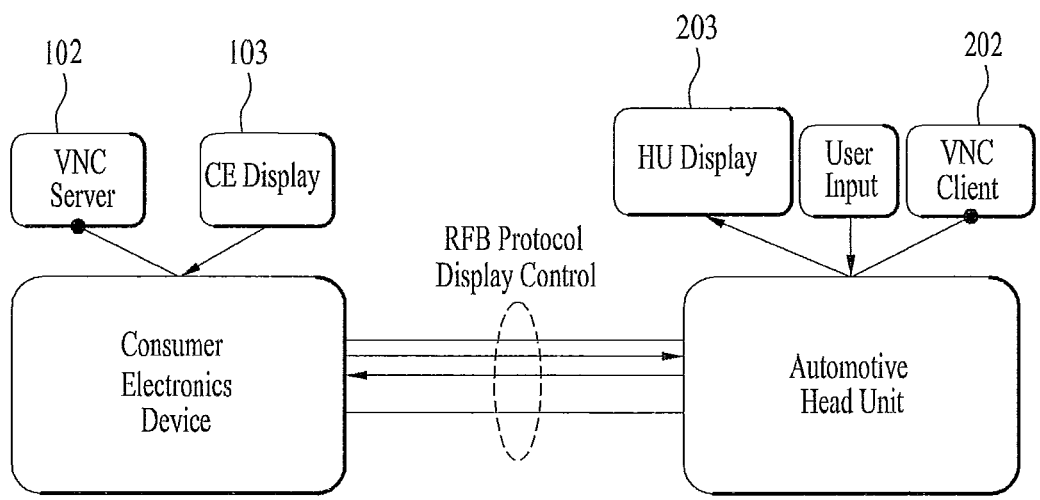
FIG. 7 is a schematic diagram of a screen transmitting system of an image display device and a mobile terminal according to an embodiment of the present invention.

FIG. 7 is a schematic diagram of a screen transmitting system of an image display device 200 and a mobile terminal 100 according to an embodiment of the present invention.

Referring to FIG. 7, a mobile terminal 100 may include a VNC server 102 as a module in charge of the above-mentioned VNC service and an output unit 103 configured to output a transmitted screen to a user. An image display device 200 may include a VNC client 202 as a module in charge of the aforementioned VNC service and an output unit 203 configured to output a transmitted screen to a user.

The VNC server 102 and the VNC client 202 of the present invention may be implemented by the controller 180 of the mobile terminal 100 and the controller 212 of the image display device 200, respectively. Alternatively, the VNC 102 and the VNC client 202 may be implemented into independent software modules, respectively.

The VNC server 102 and the VNC client 202 may perform the VNC service of transmitting screen information of the mobile terminal 100 or the image display device 200 using the VNC (virtual networking computing).

As mentioned in the foregoing description, in order to perform the VNC service, each of the VNC server 102 and the VNC client 202 transmits screen information and display control information of one device to the other device using the RFB (remote frame buffer) protocol for enabling remotely-located devices to share a frame buffer with each other. In this case, the display control information of the present invention may include information related to a transmitted screen, information on a frame buffer of each device and the like.

In the following description, the VNC service of the present invention is explained in detail with reference to the accompanying drawings.

Figure 8:
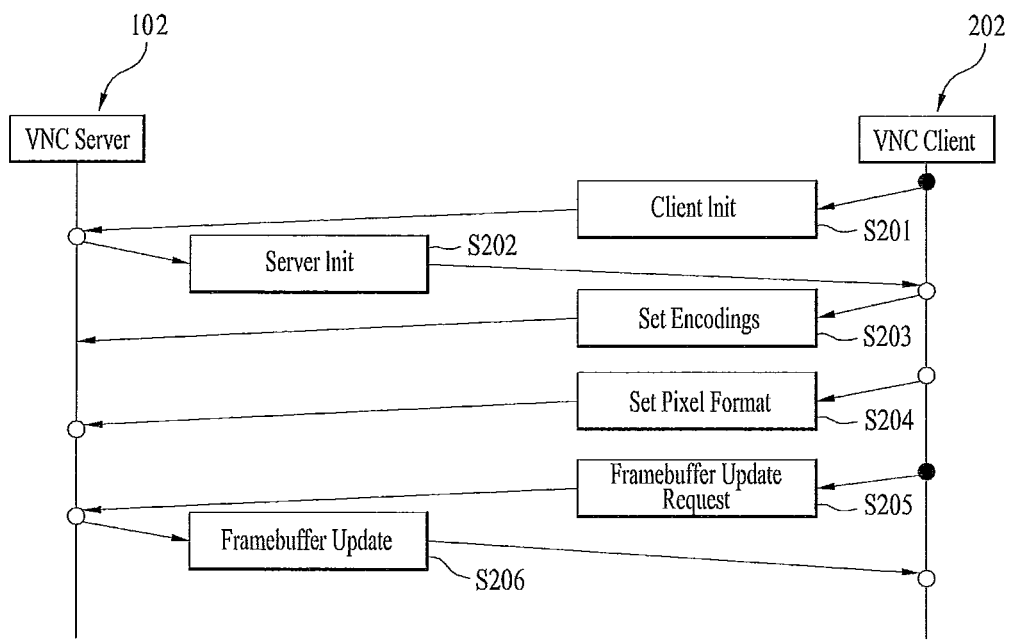
FIG. 8 is a flowchart of VNC service according to an embodiment of the present invention.

FIG. 8 is a flowchart of VNC service according to an embodiment of the present invention.

Referring to FIG. 8, according to the VNC service of the present invention configured to transmit screen information of a mobile terminal 100 to an image display device 200, the screen information of the mobile terminal 100, which is saved in a frame buffer of the mobile terminal 100, is transmitted to the image display device 200.

The aforementioned VNC service of the present invention can be performed by the steps shown in the drawing. The VNC service of the present invention is described in detail with reference to the accompanying drawing.

First of all, a VNC client 202 sends a client init message containing a size, name, color support information and the like of a frame buffer of an image display device 200 to a VNC server 102 [S201]. And, the VNC server 102 sends a server init message containing a size, name, color support information and the like of a frame buffer of a mobile terminal 100 to the VNC client 202 [S201].

The VNC client 202 sends a set encodings message containing encoding type information on an encoding type supportable by the image display device 200 to the VNC server 102 [S203]. Subsequently, the VNC server 102 encodes screen information of the mobile terminal 100 by an encoding type supportable by the image display device 200 and then transmits the encoded information.

The VNC client 202 sends a set pixel format message containing compression scheme information supportable by the image display device 200 to the VNC server 102 [S204]. Subsequently, the VNC server 102 compresses the screen information of the mobile terminal 100 by the compression scheme supportable by the image display device 200 and then transmits the compressed information.

The VNC client 202 sends a framebuffer update request message containing information for requesting the frame buffer of the mobile terminal to update the screen information of the mobile terminal 100 to the VNC server 102 [S205].

Having received the framebuffer update request message, the VNC client 202 updates the current screen information of the mobile terminal 100 in the frame buffer.

The VNC server 102 sends a framebuffer update message containing information indicating that the screen information in the frame buffer of the mobile terminal 100 has been updated and the corresponding information in the updated frame buffer to the VNC client 202 [S206].

Finally, the VNC client 202 brings the screen information of the mobile terminal 100 from the updated frame buffer of the mobile terminal 100 and then outputs the corresponding screen information to the image display device 200.

As mentioned in the foregoing description, in the VNC service of the present invention, the VNC server 102 and the VNC client 202 exchange various messages to perform the VNC service. In the following description, messages used by the VNC service of the present invention are explained.

FIG. 9 is a table of a message of VNC service according to an embodiment of the present invention. And, FIG. 10 is a table of an extended message of VNC service according to an embodiment of the present invention.

Referring to FIG. 9 and FIG. 10, a message of a VNC service of the present invention may include Set Pixel Format, Set Encodings, Framebuffer Update Request, Key Event, Pointer Event, Client Cut Text, Framebuffer Update, Set Color Map Entries, Bell, and ServerCutText.

The Set Pixel Format may include information on a compression scheme (pixel format) supportable by the image display device 200.

The Set Encodings may include information on an encoding type supportable by the image display device 200.

The Framebuffer Update Request may include information for making an update of screen information of the mobile terminal 100 to the frame buffer of the mobile terminal 100.

The Key Event may include information on an event occurring by a hard key (e.g., a keyboard in case of PC) of the image display device 200.

The Pointer Event may include information on an event occurring by a pointer of the image display device 200.

The Client Cut Text may include information on clipboard event information of the image display device 200.

The Framebuffer Update may include information indicating that screen information has been updated in the frame buffer of the mobile terminal 100 and information on the updated frame buffer. The Framebuffer Update Message shall be described in detail with reference to FIG. 15 and FIG. 16 later.

The Set Color Map Entries may include color map (palette) information of a screen saved in a frame buffer.

The Bell may include information for generating a bell sound from the image display device 200.

The ServerCutText may include clipboard event information of the mobile terminal 100.

Meanwhile, the extended message of the VNC service of the present invention may include various messages shown in FIG. 10 as various control informations for sharing a screen of the mobile terminal 100.

In the extended message, Display Configuration may include such information of a frame buffer as information on possibility of screen direction change, information on possibility of up/down scaling, information on possibility of Empty Framebuffer Update Message Handling, information on possibility of supporting Framebuffer Alternative Text, information on a supportable pixel format, information on a physical size of a device, information on a distance from a user and the like. The Client Display Configuration corresponding to the various informations of the frame buffer of the image display device 200 shall be described in detail with reference to FIG. 14 later.

The Event Configuration may include information on language setting of keyboard or UI, information on various hard keys (e.g., knob, ITU key, virtual keyboard, etc.) and event (e.g., input type such as single/multi touch, a count of total inputs of multi-touch, pressure, etc.) setting information.

The Event Mapping may include information on a request and processing for an input function activation for a hard key event.

The Device Status may include such device status information as possibility of key/touch input of device, lock/unlock, screen saver mode, night mode, audio input, presence or non-presence of disturbance caused to a vehicle driver, current horizontal/vertical angle of frame buffer and the like.

The Framebuffer/Audio Blocking Notification may include message information indicating that a delivered frame buffer/audio is cut off.

The Touch Event may include multi-touch input information.

Meanwhile, the VNC service of the present invention provides frame transformation. According to the frame transformation of the present invention, screen information of a mobile terminal 100 is transmitted to an image display device 200 in a manner of being transformed.

In particular, the mobile terminal 100 does not transmit whole pixel data of a screen of the mobile terminal 100 but transmits the screen of the mobile terminal 100 in a manner of reducing a size of the screen of the mobile terminal 100 or changing a pixel format of the screen of the mobile terminal 100 (e.g., decreasing a color depth).

In the following description, a method of transmitting a screen between an image display device 200 and a mobile terminal 100 using frame transformation is explained.

Figure 11:
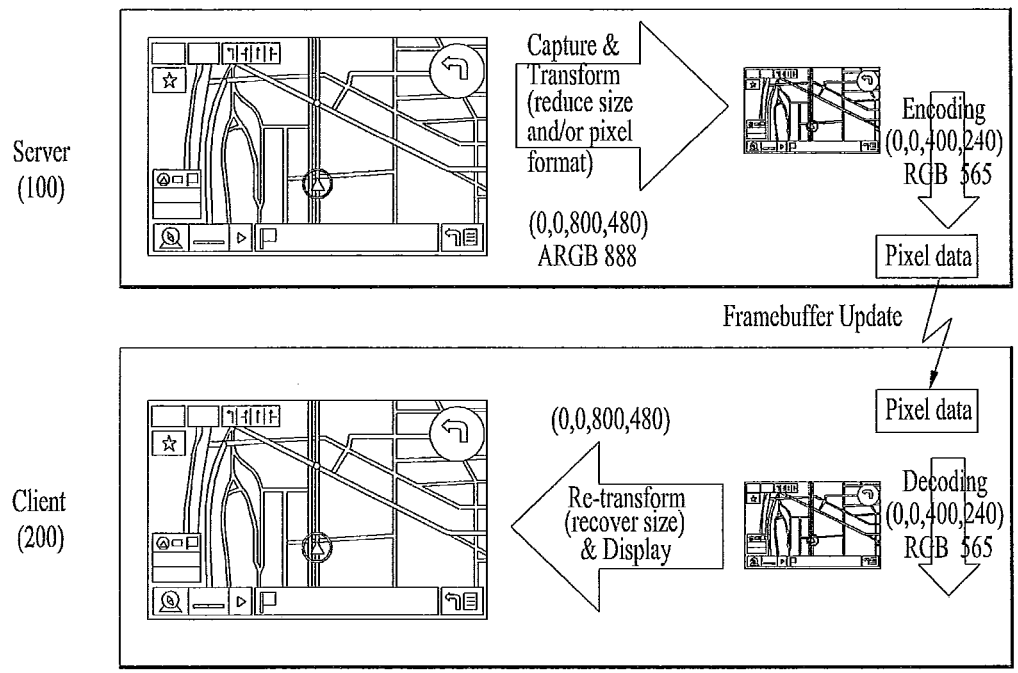
FIG. 11 is a diagram for a method of transmitting a screen between an image display device and a mobile terminal according to an embodiment of the present invention.

FIG. 11 is a diagram for a method of transmitting a screen between an image display device 200 and a mobile terminal 100 according to an embodiment of the present invention.

Referring to FIG. 11, according to a method of transmitting a screen between an image display device 200 and a mobile terminal 100 using the frame transformation of the present invention, the mobile terminal 100 creates screen information of the mobile terminal 100. For instance, the mobile terminal 100 may be able to create the screen information by capturing a current frame buffer of the mobile terminal 100.

Subsequently, the mobile terminal 100 transforms an image size of the created screen information, a pixel format of the created screen information or the like. For instance, the screen information of the mobile terminal 100 may be transformed in a manner of reducing a size of an image or changing a color depth of a pixel format into a low color depth. In this case, it may be able to reduce a data size of the screen information. The mobile terminal encodes the transformed screen information by an encoding type supportable by the image display device 200.

The above-transformed screen information of the mobile terminal 100 may be transmitted to the image display device 200 using the aforementioned VNC service. In particular, the mobile terminal 100 may transmit the transformed screen information of the mobile terminal 100 to the image display device 200 via such a message as Framebuffer Update and the like.

Subsequently, the image display device 200 performs decoding and re-transformation on the received screen information of the mobile terminal 100. In particular, the image display device 200 decodes the encoded screen information and then retransforms the reduced image size into the original size. The image display device 200 then outputs the retransformed screen information of the mobile terminal 100 to a user.

According to a method of transmitting a screen between an image display device 200 and a mobile terminal 100 using the aforementioned frame transformation, since a data size of a transmitted screen information is reduced, it may be able to save encoding/decoding/data transmission time and the like and increase a frame rate of a transmitted screen.

In a method of transmitting a screen between an image display device 200 and a mobile terminal 100, it may be able to dynamically apply the aforementioned frame transformation in accordance with a status of a screen of a device or the mobile terminal 100. In particular, in accordance with the status of the screen of the device or the mobile terminal 100, whether to use the frame transformation may be set different or a screen transformation level may be set different.

For instance, like a case that data processing performance of the mobile terminal 100 or the image display device 200 is low, a case that a screen changes, or a case that a screen is switched by an occurrence of a user input to a screen, in case that a screen of high definition is unnecessary, an image size may be further reduced or screen information may be changed into a pixel format having a low color depth.

In particular, when a screen is switched by an occurrence of a user input to a screen, if an image size is further reduced or screen information is changed into a pixel format having a low color depth, a screen switching speed (i.e., screen response sped) may be increased.

In this case, according to the present invention, a switched image size and color depth may be determined in a manner of being selected from preset resizing levels and pixel formats.

FIG. 12 is a table of a resizing level according to an embodiment of the present invention. And, FIG. 13 is a table of a pixel format according to an embodiment of the present invention.

Referring to FIG. 12, the present invention may determine a resizing factor in accordance with a resizing level. In particular, if a resizing level becomes higher, a resizing factor and a transformed image size may be set smaller.

Referring to FIG. 13, the present invention may define a specific pixel format including such information as color depth, bits-per-pixel and the like. And, the present invention may use a conventional pixel format already known to the public.

On the other hand, in case that data processing performance of the mobile terminal 100 or the image display device 200 is high, for such a still image as an SMS image, an email image and the like, frame transformation may not be used, a resizing level may be lowered (i.e., a resizing level may be increased), screen information may be changed into a pixel format having a high color depth. Hence, it may be bale to transmit and output screen information of high definition.

In the following description, a data structure for implementing the above-described screen transmitting method between the mobile terminal 100 or the image display device 200 is explained with reference to the accompanying drawings.

FIG. 14 is a table of client display configuration according to an embodiment of the present invention.

Referring to FIG. 14, as mentioned in the foregoing description, a client display configuration according to an embodiment of the present invention may include information on a frame buffer of an image display device 200 and the like.

The client display configuration according to the embodiment of the present invention may further include Frame Transformation Used and Pixel Format Support as well as the information on the frame buffer of the image display device 200.

The Frame Transformation Used may include information indicating whether to apply the aforementioned frame transformation in the screen transmission between the mobile terminal 100 and the image display device 200.

The Pixel Format Support may include pixel format information supportable by the image display device 200.

The VNC client 202 may send a client display configuration message to the VNC server 201. And, the VNC server 201 and the VNC client 202 may perform the aforementioned screen transmitting method of the mobile terminal 100 and the image display device 200 in accordance with the client display configuration information.

Figure 16:
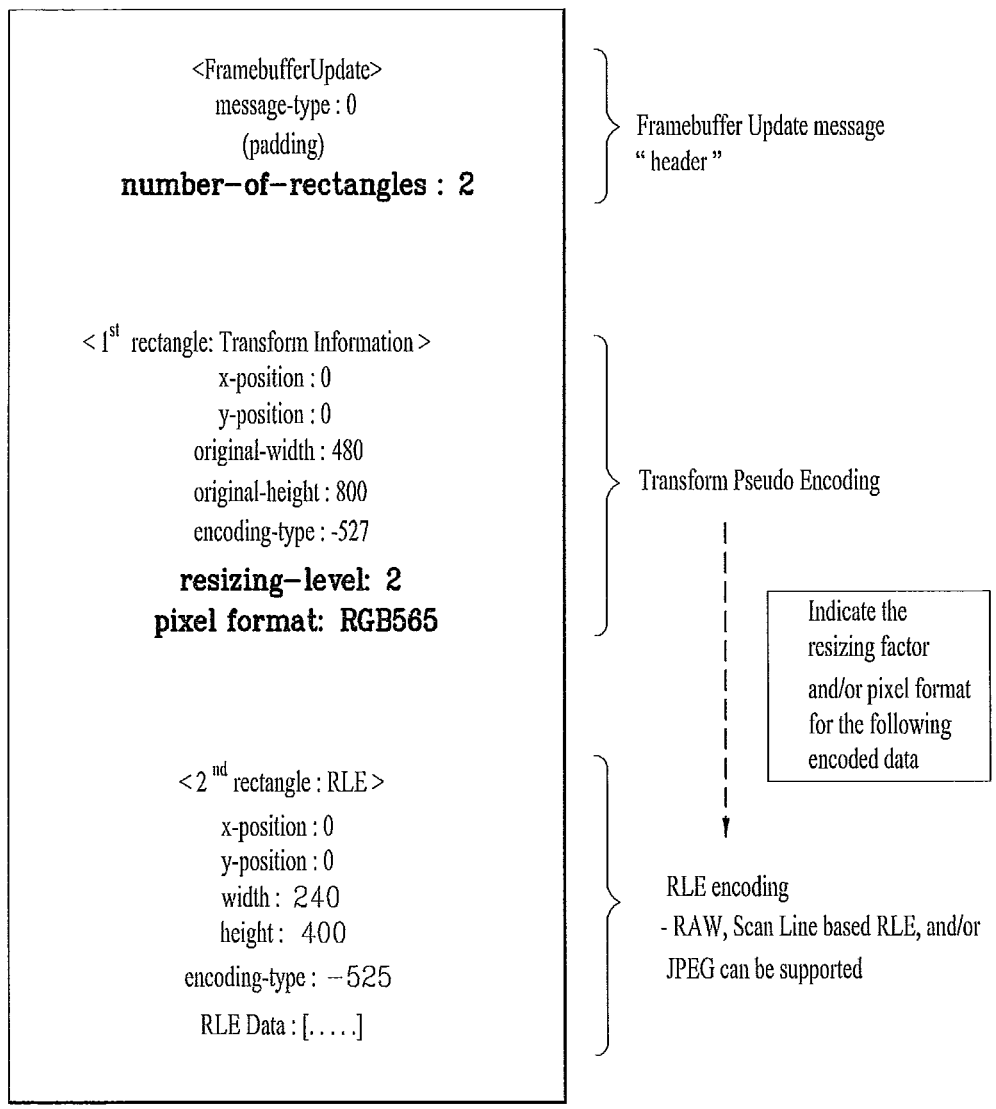
FIG. 16 is a diagram for one example of a framebuffer update message according to an embodiment of the present invention.

FIG. 15 is a table of a framebuffer update according to an embodiment of the present invention, and FIG. 16 is a diagram for one example of a framebuffer update message according to an embodiment of the present invention.

As mentioned in the foregoing description, Framebuffer Update of the present invention may include information indicating that screen information is updated in the frame buffer of the mobile terminal 100 and information related to a corresponding updated screen.

The Framebuffer Update of the present invention may further include Resizing Level and Pixel Format, as shown in FIG. 15.

The Resizing Level may include the aforementioned resizing factor information defined in FIG. 12. And, the Pixel Format may include the aforementioned pixel format information defined in FIG. 13.

In the example of Framebuffer Update message, Resizing Level and Pixel Format are set to 2 and RGB565, respectively.

According to this example, the screen information currently updated in the frame buffer of the mobile terminal indicates that an image size of an original screen is reduced by ¼ and that a pixel format of the original screen is changed into the pixel format 'RGB565'.

The image display device 200 enlarges the received screen information by 4×-size and then outputs the screen information of the mobile terminal 100 to a user by performing image processing in accordance with the pixel format 'RGB565'.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image display device mounted on a vehicle, the image display device comprising:
   a communication unit configured to receive screen information of a mobile terminal and first control information of the screen information from the mobile terminal, the first control information includes an image size transformation information of the screen information and an image compression format information of the screen information;
   a controller configured to transform the screen information based on the first control information; and
   a display unit configured to output the transformed screen information, wherein the transformed screen information comprises a shared screen between the image display device and the mobile terminal,
   wherein the controller is further configured to:
   modify the image size transformation information and the image compression format information based a status of a screen change, and
   control the communication unit to transmit second control information including the modified image size transformation information and the modified image compression format information,
   wherein the modified image size transformation information and the modified image compression format information are adjusted based on a performance status of the image display device or the mobile terminal,
   wherein the screen information is changed into a pixel format having a low color depth based on receiving a user input, and
   wherein the screen information is changed into a pixel format having a high color depth while displaying a still image.

2. The image display device of claim 1, wherein the communication unit is further configured to receive the first control information, which is modified by the mobile terminal based on the second control information.

3. The image display device of claim 1, wherein the second control information further comprises a supportable encoding type information and a supportable compression format information.

4. The image display device of claim 1, wherein the second control information further comprises an information of a first frame buffer included in the image display device mounted on the vehicle.

5. The image display device of claim 1, wherein the image size transformation information comprises multiple information of an image size of the screen information.

6. The image display device of claim 1, wherein the controller is further configured to receive the screen information generated from a second frame buffer included in the mobile terminal.

7. The image display device of claim 6, wherein the second control information comprises an information for requesting the second frame buffer to update the screen information.

8. The image display device of claim 6, wherein the first control information comprises an information for notifying the second frame buffer that the screen information has been updated and an information of the updated second frame buffer.

9. The image display device of claim 1, wherein information on a screen direction change is transmitted from the mobile terminal to the image display device.

10. The image display device of claim 1, wherein information indicating that audio data is cut off is transmitted from the mobile terminal to the image display device.

11. The image display device of claim 1, wherein multiple information are transmitted from the mobile terminal to the image display device, and further the multiple information comprises information on an lock/unlock mode, screen saver mode and audio input mode.

12. A mobile terminal comprising:
   a communication unit configured to transmit screen information of the mobile terminal and first control information of the screen information to an external image display device; and
   a controller configured to control the communication unit to receive second control information of the screen information from the external image display device, wherein the screen information comprises a shared screen between the external image display device and the mobile terminal, and modify the first control information in accordance with the second control information,
   wherein the first control information comprises an image size transformation information of the screen information and an image compression format information of the screen information,
   wherein the second control information comprises modified image size transformation information and modified image compression format information based on a status of a screen change by the external image display device,
   wherein the modified image size transformation information and the modified image compression format information are adjusted based on a performance status of the image display device or the mobile terminal, wherein the screen information is changed into a pixel format having a low color depth based on receiving a user input, and wherein the screen information is changed into a pixel format having a high color depth while displaying a still image.

13. The mobile terminal of claim 12, wherein the communication unit is further configured to transmit the first control information, which is modified by the mobile terminal based on the second control information.

14. The mobile terminal of claim 12, wherein the second control information further comprises an encoding type information supportable by the image display device and an information of a first frame buffer included in the image display device mounted on the vehicle.

15. The mobile terminal of claim 12, wherein the image size transformation information comprises multiple information of an image size of the screen information.

16. The mobile terminal of claim 12, wherein the controller is further configured to generate the screen information from a second frame buffer included in the mobile terminal.

17. The mobile terminal of claim 16, wherein the second control information comprises information for requesting the second frame buffer to update the screen information.

18. The mobile terminal of claim 16, wherein the first control information comprises information for notifying the second frame buffer that the screen information has been updated and information of the updated second frame buffer.

19. The mobile terminal of claim 12, wherein information on a screen direction change is transmitted from the mobile terminal to the image display device.

20. The mobile terminal of claim 12, wherein information indicating that audio data is cut off is transmitted from the mobile terminal to the image display device.

21. The mobile terminal of claim 12, wherein multiple information are transmitted from the mobile terminal to the image display device, and further the multiple information comprises information on an lock/unlock mode, screen saver mode and audio input mode.

* * * * *